April 29, 1924.
F. RUSCHKE
DIESINKING MECHANISM
Filed Jan. 6, 1923
1,492,221
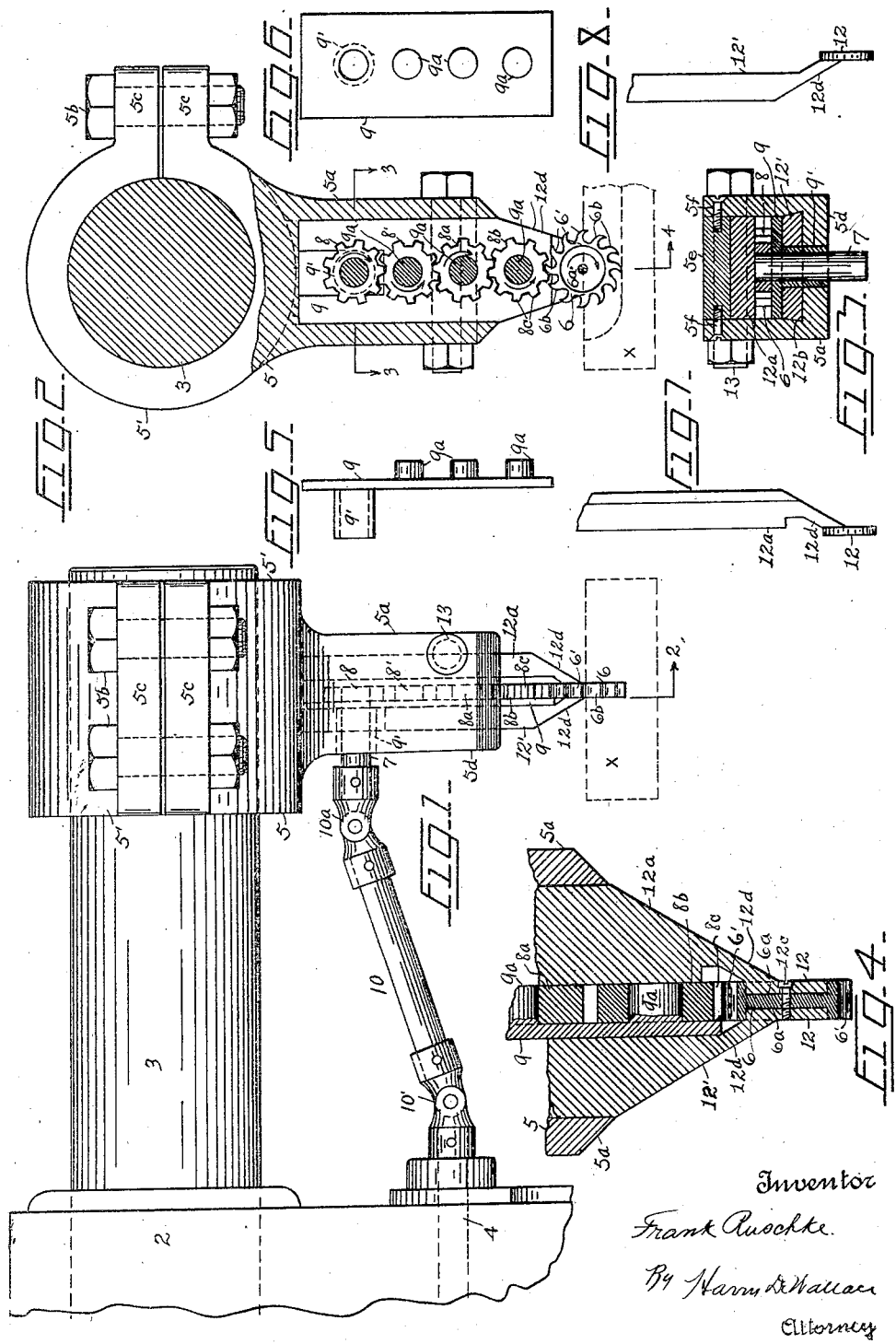
Inventor
Frank Ruschke.
By Harry D. Wallace
Attorney Patented Apr. 29, 1924.

1,492,221

UNITED STATES PATENT OFFICE.

FRANK RUSCHKE, OF SYRACUSE, NEW YORK.

DIESINKING MECHANISM.

Application filed January 6, 1923. Serial No. 611,043.

*To all whom it may concern:*

Be it known that I, FRANK RUSCHKE, a citizen of the United States, residing at Syracuse, in the county of Onondaga and State of New York, have invented certain new and useful Improvements in Diesinking Mechanism, of which the following is a specification.

This invention relates to die-sinkers, designed for use by die-makers, and the like, for cutting sunken dies, particularly of the type employed for producing die-castings.

Heretofore, the work of sinking dies has been largely effected by circular cutters, which have been mounted upon arbors, such as the tool-arbors commonly associated with the ordinary milling-machines, and the cutting ranges of the said tools has invariably been limited to the clearance between the arbors and the periphery of the circular cutters. In cases where the die cavities are to be of greater depth than the range of these older cutters, some other kind of tools must be employed for completing the die-sinking work. It is a particular object of the present invention, to provide a circular die-sinking tool, which, instead of being mounted upon an arbor, as described, is rotatably disposed between two jaws of peculiar and novel construction, which allow the said tool to be sunk more than one-half of its diameter during the die-sinking operations. A further object is to provide a novel and simple holder for the die-sinking mechanism, which may be readily attached to the adjustable arm of any ordinary milling machine. And a further object is to provide novel and simple means for driving the circular cutter, and for connecting the said means with a driven part of the milling machine.

I attain these objects by the means set forth in the detailed description which follows, and as illustrative by the accompanying drawing, in which—

Figure 1 is a broken side elevation of a milling machine to which my improvement is applied. Fig. 2 is a transverse vertical section, taken on line 2 of Fig. 1; showing the means for driving the rotary cutter. Fig. 3 is a horizontal section, taken on line 3—3 of Fig. 2. Fig. 4 is a fragmentary vertical section, taken on line 4 of Fig. 2. Figs. 5 and 6 are respectively an edge and a face view of the gear-supporting plate. And Figs. 7 and 8 are respectively edge views of the detachable jaws, which directly support the die-cutter.

In the drawing, 2 represents the head of a milling-machine; 3 is the adjustable arm, common to machines of the class, and 4 is the arbor or spindle, which usually supports the rotary milling cutters, and may be driven by any suitable power.

My improvement consists of the following parts: 5 represents the holder for the die-sinking mechanism, which preferably comprises a split loop 5', and an integral depending shank $5^a$. The loop 5' is preferably bored out to slidably fit the arm 3, to which the holder may be rigidly clamped by bolts $5^b$, which pass through spaced flanges $5^c$. The shank $5^a$ is hollow, and preferably has one open side, which may be closed by a removable plate $5^e$, the latter being held in place by screws $5^f$. 6 represents one form of rotary die-cutter, which may be used in connection with the other parts of the invention. The shank $5^a$ is usually disposed in the line of the transverse axis of the arbor 4, but may be adjusted and set at any suitable angle relatively to the arm 3, if desired. The closed side $5^d$ of the shank $5^a$ preferably faces the arbor 4, and is provided with a horizontal opening to receive an arbor or shaft 7. The shaft 7 is shown journaled in a sleeve 9', which may be integral to a plate 9, and the said plate is disposed vertically in the hollow shank, as shown in Figs. 1, 2, 3 and 4. The shaft 7 extends through the plate 9, and on its inner end is mounted a spur-gear 8, which bears against said plate. Below the gear 8, the plate 9 is provided with a number of alining regularly spaced trunnions $9^a$, upon which may be rotatably mounted a train of similar spur-gears, as 8', $8^a$ and $8^b$, all of the said gears meshing, and the gear 8 being arranged to drive the whole train, including the cutter 6. The lowermost gear $8^b$ is preferably so disposed that its teeth $8^c$ successively engage the radial teeth or cutting-spurs 6' of the cutter 6, for rotating the said cutter during the die sinking operations. The arrows in Fig. 2 show the directions of rotation of the cutter 6 and the several gears 8. The teeth of the cutter are preferably formed with curved back-faces 6$^b$, and the construction and arrangement of the gear 8$^b$ is such that, its teeth 8$^c$ frictionally engage these curved faces, but do not contact with or injure the sharp cutting points of the teeth 6'. The arbor 7 may be driven by the arbor 4 of the milling machine, by means of a shaft 10 and any kind of universal couplings 10' and 10$^a$.

The circular cutter 6 is rotatably supported by axially alining disc-shaped portions 12, of a pair of normally spaced jaws 12' and 12$^a$, which are detachably carried by the shank 5$^a$, and whose bottom ends extend below said shank. The discs 12 are the sole support for the cutter 6, and perform the same function as the arbors heretofore employed, for supporting cutting tools of the class. To facilitate this novel mounting of the cutter 6, the opposite faces of said cutter are countersunk, as at 6$^a$, to receive the discs 12. In the preferred construction and arrangement of the parts, the outer faces of the discs 12 are disposed flush with the corresponding faces of the cutter 6, and in order that the cutter 6 may rotate truly and smoothly on the discs 12, the sockets 6$^a$, as well as the facing sides, and the edges of the discs are carefully and accurately ground. The jaws 12' and 12$^a$ are disposed longitudinally in the shank 5$^a$, at the opposite sides of the gears 8 and the plate 9, and the jaw 12' is preferably held in place in part by a dove-tail arrangement, shown at 12$^b$ in Fig. 3. After the parts 5$^e$, 8, 9, 12' and 12$^a$ are disposed in the shank 5$^a$, they may be rigidly clamped and held in place by a bolt 13, in a well-known manner. When the cutter 6 is placed in position between the discs 12 (see Figs. 1 and 4) these parts may be held in place and at the proper tension by means of a bolt 12$^c$, as best seen in Fig. 4. The discs 12 are preferably integral parts of the jaws 12'—12$^a$, and connect with the bodies of the jaws by angular portions 12$^d$, which preferably terminate slightly above the centers or axes of the cutter 6 and the discs, as shown in Figs. 1 and 4. By this construction and arrangement, the cutter 6 may be lowered into the work $x$, during the die-sinking operations, slightly beyond its axis (12$^c$). In this manner, a die may be sunk to a greater depth, without requiring any change or stoppage of the mechanism, and without necessitating the employment of any extra tools or operations, than is possible by any of the older methods, wherein the circular milling tools are mounted on arbors, as explained. In case a die cavity has been enlarged laterally to a greater breath than the thickness of the tool 6, the latter, by reason of the tapering angular portions 12$^d$ of the jaws, may be sunk still deeper into the work $x$, than that shown in Figs. 1 and 2.

Obviously the number of the driving gears 8 may be varied, and various other changes or re-arrangements may be made in the mechanism, in order to adapt my improvement for sinking dies of different character, without departing from the invention, as herein shown, described and claimed.

Having thus described my invention, what I claim, is—

1. In a die-sinking mechanism, a circular cutting tool having socket bearings in its opposite sides, a pair of jaws engaging said bearings for rotatably supporting said tool, a power driven shaft for operating said tool, a train of meshed gears operatively connecting said shaft with said tool, a support for said gears removably inclosed between said jaws, and means removably supporting said jaws.

2. In a die-sinking mechanism, a circular cutting tool having circular sockets in its opposite sides, a pair of jaws having disc-shaped portions engaging said sockets for rotatably supporting said cutting tool, a train of gears for driving said cutting tool, a holder having a recess in which the jaws are removably mounted, a plate interposed between the jaws and supporting the train of gears, means for securing said jaws and plate in the recess of said holder, and means for driving said train of gears.

3. In a die-sinking mechanism, a holder adapted to be adjustably applied to a milling-machine, said holder having a hollow shank, a circular cutting tool, a pair of jaws having axially alining disc-shaped portions for operatively supporting said cutting tool therebetween, said jaws adapted to be detachably inserted in said shank, and a train of gears for driving the cutting tool disposed between and carried by said jaws adapted to be driven by a moving part of the milling machine.

4. In a die-sinking mechanism, a circular cutting tool having radial cutting teeth and having concentric circular sockets in its opposite sides, a pair of spaced jaws removable as a unit having disc-shaped portions which are received in said sockets for rotatably supporting said cutting tool, a train of meshed gears carried by the jaw for driving said cutting tool, a gear at one end of said train meshing with the teeth of the cutting tool, a driving-shaft supporting the gear at the other end of the train, and means for driving said shaft and said gears.

5. In a die-sinking mechanism, a circular cutter provided with radial cutting spurs and having axially alining circular sockets in its opposite sides, a pair of spaced jaws having intermediately arranged trunnions and also axially alining portions which latter engage said sockets for rotatably supporting said cutter, the said jaws adjacent said alining portions being angular for facilitating the sinking of a die cavity beyond the axis of the cutter, a holder for said jaws, a train of meshing gears journaled on the trunnions of said jaws adapted to drive said cutter, and a shaft supporting one of said gears and driving said train.

In testimony whereof I affix my signature.

FRANK RUSCHKE.